United States Patent Office 3,634,457
2,3-EPITHIOPROPYL N,N-DIALKYL-THIOLCAR-
BAMATES AND USE AS HERBICIDES
William Carter Doyle, Jr., Shawnee Mission, Kans., assignor to Gulf Research & Development Company, Pittsburgh, Pa.
No Drawing. Original application Mar. 24, 1967, Ser. No. 625,603, now Patent No. 3,510,290, dated May 5, 1970. Divided and this application July 30, 1969, Ser. No. 854,344
Int. Cl. C07d 59/00
U.S. Cl. 260—327 E
15 Claims

ABSTRACT OF THE DISCLOSURE

By a method of synthesis based on a secondary amine, carbon disulfide and epichlorohydrin there are produced 2,3-epithiopropyl N,N-dialkylthiolcarbamates which are used as selective herbicides, particularly in pre-emergent control of grasses such as brome and volunteer oats.

SUMMARY OF INVENTION

This application is a division of U.S. Ser. No. 625,603 filed Mar. 24, 1967, now U.S. Pat. 3,510,290.

It is known that reaction of carbon disulfide with a secondary amine readily produces the amine salt of a corresponding dithiocarbamate, as illustrated below:

$$2 \underset{R'}{\overset{R}{\diagup}}N-H + CS_2 \longrightarrow \underset{R'}{\overset{R}{\diagup}}N-\underset{\underset{S}{\overset{\|}{C}}}{}-SH \cdot HN\underset{\diagdown R'}{\overset{\diagup R}{}}$$

The product obtained by this reaction is often employed in manufacturing dithiocarbamate salts and esters.

It has now been discovered, however, that by reaction of an N,N-disubstituted dithiocarbamic acid or its salts with epichlorohydrin, valuable herbicidal products are produced which are not dithiocarbamates but which apparently result from a combined esterification and intramolecular rearrangement. The course of the reaction is illustrated as follows:

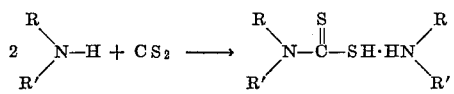

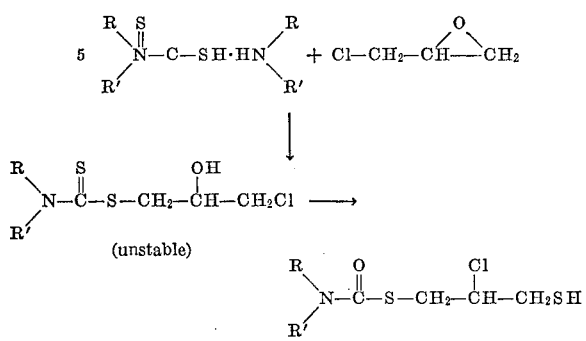

The product possesses very selective herbicidal activity against a few grasses, particularly brome and oats, and is readily converted to the corresponding epithio ester which possesses similar herbicidal activity and greater chemical stability:

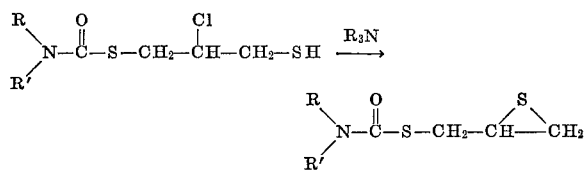

The highly selective pre-emergent phytotoxicity of the novel compositions is particularly useful for application at the time of planting such crops as alfalfa and corn. Certain specific compounds of the group may also be applied at the time of planting soybeans and cotton. The preferred selective pre-emergent herbicides are 2,3-epithiopropyl N,N-dihydrocarbon substituted thiolcarbamates in which the two hydrocarbon substituents contain a total of less than ten carbon atoms. The hydrocarbon substituents may include alkyl, cycloalkyl from cyclopropyl to cyclohexyl and lower alkenyl groups.

DETAILED DESCRIPTION

(I) Synthesis methods

The compounds of the series, 2,3-epithiopropyl N,N-dialkylthiolcarbamates, are prepared by two general methods, one a three-step process, with isolation of intermediates and the other essentially a single-step process.

Method A

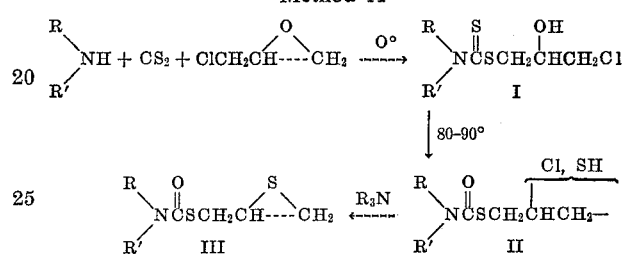

The initial low temperature reaction is believed to include reaction of epichlorohydrin with N,N-dialkylthiocarbamic acid.

Method B

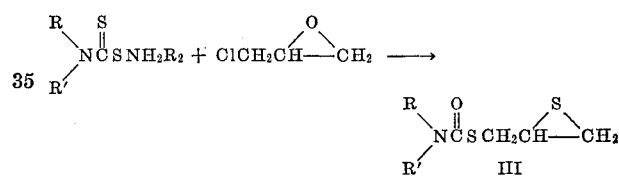

The reaction of epichlorohydrin with a salt (which may also be a metal salt, as well as an amine salt) appears to require a higher temperature than reaction with the acid.

In an experiment in which both routes were used to prepare the same N,N-diethyl thiolcarbamate compound, the yields were roughly equivalent. In syntheses based on morpholine, dicyclohexylamine or isopropyl cyclohexylamine as starting materials, Method B has been found to be the only successful route, with the dithiocarbamate salt being the sole product obtained in the first step of Method A, rather than the more reactive free acid.

Intermediates I and II are isolable, though not easily purified. I is thermally unstable, rearranging to II in a matter of several hours to several days, depending on the nature of the N substituents. The structure of I is thought to be as shown, based on its infrared spectrum and the NMR spectrum of its phenylurethane derivative. Intermediate II is relatively stable and suitable for herbicidal use, various type II compounds showing qualitatively the same activity as the corresponding type III compounds. The structure of II is not firmly established but present evidence favors the structure shown in the reaction diagram below.

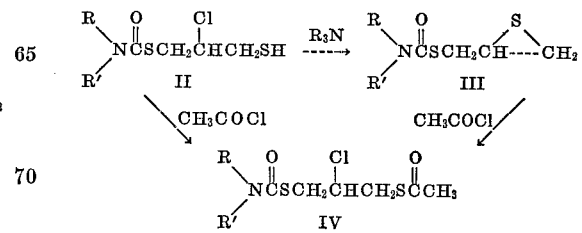

On treatment with acetyl chloride both II and III give compounds (IV) having the same NMR spectrum and, while this spectrum is not readily interpreted, a mixture of position isomers cannot be excluded, comparison with model compounds suggests the structure shown.

The success of this sequence of reactions leading to a thiolcarbamate apparently requires a secondary amine as starting material. In three instances in which a primary amine was used the crude products decomposed extensively and no epithiopropyl thiolcarbamate (III), was obtained. In one experiment, starting with tert.-butyl amine, tert.-butyl isothiocyanate was found among the products of decomposition.

The final products (III) of the sequence are distillable liquids or crystalline solids. Some care must be exercised to prevent excessive heating during distillation. Otherwise the following decomposition readily occurs:

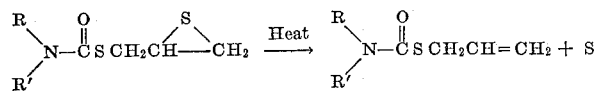

This thermal decomposition, if desired, may be used as an efficient and probably the most economical method of preparing allyl thiolcarbamate, which are products of established utility. (See, for example, British patent 808,-753.)

(II) Illustration procedures

Method A

To a well-stirred mixture of 38.0 g. (0.5 mol) of carbon disulfide and 46.3 g. (0.5 mol) of epichlorohydrin in an ice-salt bath is added 36.5 g. (0.5 mol.) of anhydrous diethylamine during 1-2 hours at 0 to $-5°$. The mixture is stirred an additional 30 minutes, then let warm slowly to room temperature. At this point the reaction mixture is essentially 3-chloro-2 - hydroxypropyl N,N - diethyldithiocarbamate, (I; R,R'=Et), a viscous yellow oil with no detectable unreacted starting materials present.

Heating of the reaction mixture for 2 hours at 80–90° under vacuum gives 110 g. of crude rearrangement product II (R,R'=Et). The course of the rearrangement may be easily followed by the disappearance of infrared absorption bands at $2.95\mu$ (OH) and $10.15\mu$ (C=S) with the appearance of bands at $3.92\mu$ (SH) and $6.0\mu$ (C=O). The rearrangement is also accompanied by a marked decrease in viscosity.

To 29 g. (0.12) mol of the crude rearranged product in 100 ml. of ether is added slowly 12 g. (0.12 mol) of triethylamine. Reaction is immediate, causing the ether to reflux gently and precipitating 10.8 g. of triethylamine hydrochloride. The solution is filtered, evaporated and vacuum distilled, giving 15.1 g. (61.4% yield overall) of 2,3 - epithiopropyl N,N - diethylthiolcarbamate (III; R,R'=Et), $b_{0.2}$ 119–20°.

Method B

A solution of 36 g. (0.173 mol) of diethylammonium diethyldithiocarbamate and 15.0 g. (0.162 mols) of epichlorohydrin in 100 ml. of dioxane is heated to reflux. Shortly after heating is begun, a crystalline precipitate appears. After two hours, the solution is cooled and filtered to recover 15.4 g. of diethylamine hydrochloride. The filtrate is vacuum distilled to remove the bulk of the solvent, leaving 33.2 g. of a viscous brown oil. Extraction of this oil with ether, decantation and evaporation of the ether gives 25.7 g. of residue, distillation of which gives 17.7 g. of III, R,R'=Et.

In Table I are listed the compounds of type III prepared by the above procedures.

TABLE I

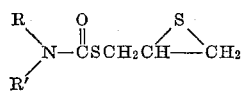

| R | R' | Method | Percent yield | B.P. or M.P. |
|---|---|---|---|---|
| Ethyl | Ethyl | A | 61.4 | 119–20°/0.2 mm. |
| Do | do | B | a 53.3 | 119–20°/1.2 mm. |
| Propyl | Propyl | A | 46.5 | 133–4°/1.2 mm. |
| Isopropyl | Isopropyl | A | 54.0 | 117–18°/0.4 mm. |
| Hexyl | Hexyl | A | 52.5 | 128–60°/0.8 mm. |
| —CH₂CH₂O CH₂CH₂— | | B | a 34.1 | 74–5°.b |
| Methyl | Methyl | B | a 9.0 | 95–107°/0.3 mm. |
| Allyl | Allyl | A | 35.0 | 128–33°/0.1 mm. |
| 2-methoxyethyl | 2-methoxyethyl | A | 24.0 | 140–55°/0.3–0.45 mm. |
| Butyl | Butyl | A | 60.5 | 143–53°/0.5–0.9 mm. |
| Isobutyl | Isobutyl | A | 24.0 | 140–3°/0.5 mm. |
| Benzyl | Methyl | A | 73.0 | Crude material, not distillable $n_D^{26}$ 1.5974. |
| Do | Isopropyl | A | 77.5 | Crude material, not distillable $n_D^{26}$ 1.5773. |
| Isoamyl | Isoamyl | A | 23.0 | 157–66°/0.1–0.9 mm. |
| Butyl | Methyl | A | 49.5 | 137–40°/0.9 mm. |
| Benzyl | Benzyl | A | 72.5 | Crude material, not distillable $n_D^{26}$ 1.6142. |
| Furfuryl | Methyl | A | 86.0 | Crude material, not distillable $n_D^{26}$ 1.5763. |
| Tetrahydrofurfuryl | do | A | 53.5 | Crude material, not distillable $n_D^{26}$ 1.5581. |
| Octyl | do | A | 88.5 | Crude material, not distillable $n_D^{26}$ 1.5156. |
| Cyclohexyl | do | A | 86.0 | M.P. 55.5–58°. b |
| Butyl | Ethyl | A | 9.5 | 122–6°/0.1 mm. |
| Propyl | Methyl | A | 46.0 | 129–34°/0.8 mm. |
| Isopropyl | Ethyl | A | 56.5 | 129–31°/0.8 mm. |
| Cyclohexyl | Isopropyl | B | a 90.0 | Crude material, not distillable $n_D^{20}$ 1.5500. |
| Do | Cyclohexyl | B | 88.0 | M.P. 96.6–98°.b |
| Do | Ethyl | A | 82.0 | Crude material, not distillable $n_D^{26}$ 1.5503. | a Yield based on epichlorohydrin charged.
b Crude product crystallized and was recrystallized from hexane.

(III) Herbicidal use

Pre-emergent herbicidal activity was evaluated by means of the following procedure:

A solution was prepared by dissolving 290 mg. of the compound to be tested in 200 ml. of acetone. Disposable paper half-flats were prepared and seeded, then sprayed with the acetone solution at the rate of 20 pounds of active chemical per acre of sprayed area. One flat, which had been seeded with alfalfa, brome, flax, oats, radishes and sugar beets was held at 75° F. day temperature; another seeded with corn, coxcomb, cotton, crabgrass, millet and soybeans was held at 85° F. Twenty-one days after seeding and treatment the flats were examined and plant emergence and effects on growth were rated according to the schedule set forth below.

| Type of action: | Degree |
|---|---|
| C=chlorosis (bleaching) | 0=no effect. |
| N=necrosis | 1=slight effect. |
| G=growth inhibition | 2=moderate effect. |
| F=formative effect (abnormal form of growth) | 3=severe effect. |
| K=non-emergence | 4=maximum effect (all plants died). |

Following are tabulated the results of tests according to the above procedures on a representative group of thiolcarbamates.

PRE-EMERGENT HERBICIDAL ACTIVITY

Compound $$R \atop R' \!\!\!\diagdown\!\! N-\underset{\underset{O}{\|}}{C}-S-CH_2CH\diagup\!\!\!\overset{S}{\diagdown}\!\!\!\diagup CH_2$$

| R | R' | Crab-grass | Cox-comb | Brome | Millet | Soy-bean | Cotton | Alfalfa | Oats | Corn | Flax | Radish | Sugar-beet |
|---|---|---|---|---|---|---|---|---|---|---|---|---|---|
| Ethyl | Ethyl | G1 F1 | 0 | K3 | G1 F1 | 0 | G1 | 0 | G1 | 0 | 0 | 0 | 0 |
| Isopropyl | Isopropyl | 0 | G1 | K4 | G2 G1 | F1 G1 | 0 | 0 | G3 | 0 | 0 | 0 | 0 |
| Propyl | Propyl | G3 F3 | G1 | K4 | G3 F3 | F2 G1 | G1 | 0 | K4 | 0 | 0 | G3 | G1 |
| Hexyl | Hexyl | 0 | 0 | 0 | 0 | 0 | 0 | G1 0 | 0 | 0 | 0 | 0 | 0 |
| Butyl | Ethyl | G2 F2 | 0 | K4 | G2 F2 | 0 | 0 | G1 F1 | K4 | 0 | 0 | 0 | G1 |
| Isopropyl | do | 0 | 0 | K4 | 0 | F1 | 0 | G1 F1 | G2 | 0 | 0 | 0 | 0 |
| Cyclohexyl | Isopropyl | G1 F1 | 0 | K2 G2 | G1 F1 | 0 | 0 | G1 F1 | G2 | 0 | 0 | 0 | 0 |
| Do | Ethyl | G1 F1 | 0 | K4 | G1 F1 | 0 | 0 | G2 F2 | G3 | G1 | G1 F1 | 0 | G1 |
| Do | Methyl | 0 | 0 | K2 G2 | 0 | 0 | 0 | G1 F1 | G1 K2 | 0 | 0 | 0 | 0 |
| Butyl | do | 0 | 0 | 0 | 0 | 0 | 0 | 0 | G2 | 0 | 0 | 0 | 0 |
| Methyl | do | 0 | 0 | 0 | 0 | 0 | 0 | 0 | G1 | 0 | 0 | 0 | 0 |
| Butyl | Butyl | K3 G3 | K3 G3 | K4 | K3 G3 | G1 C1 | 0 | G2 | K4 | 0 | 0 | 0 | G2 |
| Isobutyl | Isobutyl | K3 G3 | G1 | K4 | K3 G3 | G1 | 0 | G1 | K4 | 0 | 0 | 0 | G3 |
| Isopentyl | Isopentyl | 0 | 0 | 0 | 0 | 0 F1 | 0 | 0 | 0 | 0 | 0 | 0 | K3 |
| Allyl | Allyl | G1 | G3 | G3 | G1 | G2 | G1 | 0 | G2 | 0 | 0 | 0 | G3 |
| Cyclohexyl | Methyl | 0 | 0 | K2 G2 | 0 | 0 | 0 | G1 F1 | G1 | 0 | 0 | 0 | 0 |
| Isopropyl | Isopropyl | 0 | 0 | K4 | 0 | 0 | 0 | 0 | G3 | 0 | 0 | 0 | 0 |
| Propyl | Propyl | G3 F2 | G1 | K4 | G2 F2 | G1 | G1 | 0 | G3 F3 | 0 | 0 | G1 | 0 |
| Ethyl | Isopropyl | 0 | 0 | K4 | 0 | 0 | 0 | 0 | G2 | 0 | 0 | 0 | 0 |
| Butyl | Ethyl | G3 F2 | 0 | K4 | G2 F2 | 0 | 0 | G1 F1 | G3 F3 | 0 | 0 | 0 | G1 |
| Cyclohexyl | do | G3 | G2 | K3 K3 | G2 | G2 | G1 | G1 F1 | G1 K3 G3 | 0 | G2 | G2 | G2 |
| Isobutyl | Isobutyl | G1 | G1 | G3 | K4 | C1 | 0 | G1 C1 | G2 | 0 | 0 | 0 | G2 |
| Butyl | Butyl | K2 G2 | K3 G3 | K2 G2 | K4 | 0 | 0 | G2 | G1 | 0 | 0 | 0 | G2 |
| Allyl | Allyl | 0 | G2 | G2 | G1 | G1 | G1 | 0 | 0 | 0 | 0 | 0 | K2 G2 |

The tabulated data indicate clearly the pronounced selectivity of the pre-emergent herbicidal action of the compositions. Also demonstrated in the data is an absence of activity toward the test species when the N-substituents contain a total of twelve carbon atoms. Although lacking in the desired type of herbicidal activity, the higher N,N-dialkylthiolcarbamates are useful for other purposes, particularly in corrosion-inhibiting formulations, alone or in combination with nitrogen bases of the polyamine type, and as fungicides. The compounds derived from the higher molecular weight secondary amines in general exhibit microbiological activity without substantial effect on plant life.

What is claimed is:

1. The method of producing an N,N-disubstituted thiocarbamate ester, wherein the N,N-substitutents are alkyl, cycloalkyl or alkenyl substituents containing a total of less than ten carbon atoms, comprising reacting an N,N-disubstituted dithiocarbamate salt with epichloro-hydrin.

2. The method of producing an N,N-disubstituted thiolcarbamate ester wherein the N,N-substituents are alkyl, cycloalkyl or alkenyl substituents containing a total of less than ten carbon atoms, comprising reacting at about 0° C. a secondary amine with carbon disulfide and epichlorohydrin and heating the reaction product at about 80–90° C.

3. A compound represented by the structural formula

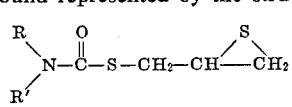

in which R and R' are alkyl, cycloalkyl or alkenyl substituents containing a total of less than 10 carbon atoms.

4. The compound according to claim 3 in which R and R' are ethyl substituents.

5. The compound according to claim 3 in which R and R' are isopropyl substituents.

6. The compound according to claim 3 in which R and R' are propyl substituents.

7. The compound according to claim 3 in which R and R' are butyl substituents.

8. The compound according to claim 3 in which R and R' are isobutyl substituents.

9. The compound according to claim 3 in which R and R' are allyl substituents.

10. The compound according to claim 3 in which R is butyl and R' is ethyl.

11. The compound according to claim 3 in which R is isopropyl and R' is ethyl.

12. The compound according to claim 3 in which R is cyclohexyl and R' is isopropyl.

13. The compound according to claim 3 in which R is cyclohexyl and R' is ethyl.

14. The compound according to claim 3 in which R is cyclohexyl and R' is methyl.

15. The compound according to claim 3 in which R is butyl and R' is methyl.

References Cited

UNITED STATES PATENTS 3,561,949   2/1971   Doyle _____ 71—100

HENRY R. JILES, Primary Examiner

C. M. SHURKO, Assistant Examiner

U.S. Cl. X.R.

N.B. No X-refs. necessary. (see patent U.S. 3,510,290)